United States Patent
Houdek et al.

(10) Patent No.: US 12,123,634 B2
(45) Date of Patent: Oct. 22, 2024

(54) HEAT PUMP, METHODS OF OPERATION AND SIMULATION

(71) Applicant: THERMO KING LLC, Minneapolis, MN (US)

(72) Inventors: Pavel Houdek, Kutna Hora (CZ); Martin Galansky, Rakovnik (CZ); Martin Soukup, Tabor (CZ)

(73) Assignee: THERMO KING LLC, Minneapolis, MN (US)

( * ) Notice: Subject to any disclaimer, the term of this patent is extended or adjusted under 35 U.S.C. 154(b) by 0 days.

(21) Appl. No.: 18/047,811

(22) Filed: Oct. 19, 2022

(65) Prior Publication Data

US 2023/0122660 A1      Apr. 20, 2023

(30) Foreign Application Priority Data

Oct. 20, 2021  (EP) .................................. 21203817

(51) Int. Cl.
   *F25B 13/00*  (2006.01)
   *F25B 40/06*  (2006.01)
   *F25B 41/31*  (2021.01)

(52) U.S. Cl.
   CPC .............. *F25B 41/31* (2021.01); *F25B 13/00* (2013.01); *F25B 40/06* (2013.01); *F25B 2600/21* (2013.01); *F25B 2600/2513* (2013.01)

(58) Field of Classification Search
   CPC .......... F25B 41/31; F25B 13/00; F25B 40/06; F25B 2600/21; F25B 2600/2513
   See application file for complete search history.

(56) References Cited

U.S. PATENT DOCUMENTS

| | | | |
|---|---|---|---|
| 2014/0082960 A1* | 3/2014 | Bison | F25B 49/02 |
| | | | 34/477 |
| 2014/0208787 A1* | 7/2014 | Furui | F25B 30/02 |
| | | | 62/238.6 |
| 2021/0063070 A1 | 3/2021 | Raimbault et al. | |

FOREIGN PATENT DOCUMENTS

| | | |
|---|---|---|
| DE | 102006058315 | 7/2007 |
| DE | 102006034193 | 8/2007 |
| EP | 1014013 | 6/2000 |
| EP | 1026459 | 8/2000 |
| EP | 1620684 | 2/2006 |
| EP | 1632733 | 3/2006 |
| EP | 2309208 | 4/2011 |
| EP | 2752627 | 7/2014 |

(Continued)

OTHER PUBLICATIONS

Okaza et al., Refrigerating Cycle Device, Jul. 9, 2003, JP2003194432A, Whole Document (Year: 2003).*

(Continued)

*Primary Examiner* — Larry L Furdge
(74) *Attorney, Agent, or Firm* — HSML P.C.

(57) ABSTRACT

There is disclosed heat pump, comprising: an internal heat exchanger configured to transfer heat from refrigerant in a liquid line pathway to refrigerant in a suction line pathway, to superheat the refrigerant upstream of a compressor; and a controller configured to: control an expansion valve to maintain a target superheat of refrigerant at a control location. The target superheat is variable and is determined based on one or more operating conditions of the heat pump. There is also disclosed a method of operating a heat pump and a simulation method to determine a variable superheat.

1 Claim, 4 Drawing Sheets

(56) References Cited

FOREIGN PATENT DOCUMENTS

| EP | 3779328 | | 2/2021 |
|---|---|---|---|
| GB | 2553970 | | 3/2018 |
| JP | H05262127 | * | 10/1993 |
| JP | H06281266 A | * | 10/1994 |
| JP | 2003194432 A | * | 7/2003 |
| WO | 2003/106900 | | 12/2003 |

OTHER PUBLICATIONS

Kawai, Air Conditioner, Oct. 7, 1994, JPH06281266A, Whole Document (Year: 1994).*
Hasegawa et al., Driving Control Method of Air-Conditioner Having Rotary Swash Plate Type Variable Capacity Compressor, Oct. 12, 1993, JPH05262127A, Whole Document (Year: 1993).*
Extended European Search Report, issued in the corresponding EP patent application No. 21203817.8, dated Apr. 4, 2022, 9 pages.

* cited by examiner

HEAT PUMP, METHODS OF OPERATION AND SIMULATION

FIELD OF THE INVENTION

The invention relates to a heat pump, method of operating a heat pump, and a simulation method for the design of a heat pump.

BACKGROUND

It is known to provide heat pumps employing vapor compression cycles for transferring heat between heat exchange mediums, for example in refrigeration and chiller systems. It is known to operate such heat pumps to ensure that dry refrigerant (as opposed to multi-phase refrigerant) is provided to the compressor, in order to avoid damage to the compressor.

SUMMARY

According to a first aspect there is disclosed a heat pump, comprising:
- a flow path for a vapor compression cycle, the flow path extending through components of the heat pump including, in flow order: a compressor, a condenser, a liquid line pathway, an expansion valve, an evaporator, and a suction line pathway to the compressor;
- an internal heat exchanger configured to transfer heat from refrigerant in the liquid line pathway to refrigerant in the suction line pathway, to superheat the refrigerant upstream of the compressor;
- a controller configured to:
  - determine a target superheat of refrigerant at a control location of the flow path, wherein the target superheat is variable, and wherein the target superheat is determined based on one or more operating conditions of the heat pump;
  - control the expansion valve to maintain the target superheat.

The target superheat may be variable over an operating map of operating conditions for the heat pump.

It may be that the controller is configured to determine the target superheat from a predetermined model or database which correlates the one or more operating conditions with the target superheat.

It may be that the model or database is stored on a non-transitory machine readable medium. It may be that the heat pump and optionally the controller of the heat pump comprises the non-transitory machine readable medium. It may be that the controller is configured to access the model or database which may be stored remotely from the controller and/or remotely from the heat pump.

It may be that the predetermined model or database is configured to output target superheats for operating conditions within a variable superheat operating map of operating conditions for the heat pump, the target superheats varying through at least a non-zero superheat range.

The superheat range may be a difference between two superheat values, and the controller may be configured to output target superheats that vary by at least the superheat range over the variable superheat operating map. The superheat range may be at least 5° C., for example at least 10° C., at least 15° C., or at least 20° C.

It may be that a controller defines limits of one or more operating conditions and only permits operation of the heat pump when the operating conditions are within these limits, thereby defining an operating map of the heat pump (which may be referred to as a global operating map as it relates to the permitted operating conditions of the heat pump). The operating map may be defined based on operating conditions of the heat pump, for example including an ambient temperature of an ambient heat exchange medium (which may be associated with a first heat exchanger of the heat pump), and/or a monitored or set point temperature of a regulated heat exchange medium (which may be associated with a second heat exchanger of the heat pump). The controller or other apparatus of the heat pump may be configured to further limit the operating map based on pressure, for example by providing a high pressure or low pressure cut-out for the heat pump based on monitoring an operating pressure within the heat pump.

The controller may be the same or a different controller to that which determines the target superheat.

The variable superheat operating map may be a subset of the operating map (e.g. the global operating map) It may be that the controller is configured to control the expansion valve based on the target superheat when operating in the variable superheat operating map; and configured to control the expansion valve based on a second relationship, model or database when operating outside of the variable superheat operating map (i.e. one which differs from the relationship, model or database used for determining the target superheat). For example, the second relationship, model or database may include any suitable control procedure for the expansion valve. An example of a suitable relationship is to control the expansion valve to maintain a predetermined constant superheat upstream of an inlet to the compressor.

It may be that the control location is between the internal heat exchanger and the compressor.

It may be that the flow path is configured to be unbranching downstream of the condenser through both liquid line and suction line portions of the internal heat exchanger, such that in use all refrigerant passing through the condenser passes through both the liquid line and suction line portions of the internal heat exchanger.

In other words, there may be no branching pathway or control components (such as valves) for directing a portion of refrigerant received from the condenser along a bypass flow path which returns to the compressor without passing through both the liquid line and suction line portions of the internal heat exchanger, or any such branching pathway or control components may be prevented from directing a portion of refrigerant along such a bypass flow path when the heat pump is operating in a respective mode (e.g. a cooling or a heating mode of the heat pump).

It may be that the heat pump comprises a first heat exchanger associated with an ambient heat exchange medium and a second heat exchanger associated with a regulated heat exchange medium. The heat pump may be configured to operate in a cooling mode and a heating mode, wherein the flow path is one of two flow paths each associated with a respective one of the cooling and heating mode. It may be that in the cooling mode the first heat exchanger functions as the condenser for heat rejection to the ambient heat exchange medium, and the second heat exchanger functions as the evaporator to receive heat from the regulated heat exchange medium. It may be that in the heating mode the second heat exchanger functions as the evaporator to receive heat from the ambient heat exchange medium, and the first heat exchanger functions as the evaporator to reject heat to the regulated heat exchange medium.

It may be that in both the cooling mode and the heating mode, the internal heat exchanger is configured to transfer heat from refrigerant in the respective liquid line pathway to refrigerant in the respective suction line pathway.

For example, the internal heat exchanger may have a liquid line portion which is common to the respective liquid line pathways of the respective flow paths, and may have a suction line portion which is common to the respective suction line pathways of the respective flow paths.

It may be that the one or more operating conditions of the heat pump are selected from the group consisting of:

operation in a cooling mode or a heating mode of the heat pump;

a temperature of a heat sink associated with the condenser;

a temperature of a heat source associated with the evaporator;

a temperature of an ambient heat exchange medium associated with the heat pump;

a temperature of, or a set-point temperature for, a regulated heat exchange medium; or a difference between the set-point temperature and the temperature of the regulated heat exchange medium; wherein a controller of the heat pump is configured to control the heat pump to maintain the set-point temperature of the regulated heat exchange medium;

a heat transfer demand at the condenser and/or at the evaporator;

a flow rate of refrigerant around the flow path, for example to meet a heat transfer demand;

a flow rate of a heat exchange medium at the condenser and/or at the evaporator;

an operating parameter of a device configured to direct a heat exchange medium over or through the condenser and/or the evaporator;

an operating parameter of the compressor, for example an operating speed, power or compression ratio.

The heat sink associated with the condenser may be the ambient heat exchange medium or the regulated heat exchange medium, depending on the operating mode of the heat pump. Similarly, the heat source associated with the evaporator may be the ambient heat exchange medium or the regulated heat exchange medium, depending on the operating mode of the heat pump Each of these parameters may be determined from a respective sensor, for example the temperatures may be determined from respective temperature sensors, and the flow rates may be determined from respective flow sensors. A heat transfer demand may be determined as a difference between a set-point temperature for the regulated heat exchange medium and a monitored temperature of the regulated heat exchange medium.

It may be that the evaporator and the internal heat exchanger are configured so that, for a subset of operating conditions within the operating map, maintaining the respective target superheat causes at least 90% of superheating upstream of the compressor to be performed in the internal heat exchanger.

A percentage of superheating performed in the internal heat exchanger corresponds to the proportion of the total temperature rise above the respective saturation temperature (i.e. the total superheat), as measured in units of temperature (e.g. ° C.), which occurs in the internal heat exchanger. For example, if refrigerant is discharged from the evaporator with a 2° C. superheat and is discharged from the internal heat exchanger with an 8° C. superheat, then 75% (=100× (8−2)/6) of the superheating upstream of the compressor is performed in the internal heat exchanger.

It may be that at least 95% of superheating upstream of the compressor is performed in the internal heat exchanger for a respective subset of operating conditions, or that 100% of superheating occurs within the internal heat exchanger. 100% of superheating in the internal heat exchanger corresponds to the refrigerant being discharged from the evaporator at a temperature which is no more than the saturation temperature.

It may be that the heat pump is configured so that, for the subset of operating conditions, maintaining the respective target superheat causes at least 90% of superheating upstream of the compressor to be performed in the internal heat exchanger. Configuring the heat pump for this effect may comprise, amongst other things, configuring the relative sizing of the evaporator and the heat exchanger, for example by configuring the respective heat transfer areas so that for the respective operating conditions, phase change is mainly performed in the evaporator, and specific heating to superheated temperatures is mainly performed in the internal heat exchanger.

It may be that the predetermined model or database as referenced above is configured to output target superheats for operating conditions within the variable superheat operating map to maintain a dry saturation location at a predetermined target location within a vaporization portion of the heat pump. It may be that the dry saturation location corresponds to transition from multiphase saturated refrigerant to dry saturated refrigerant. It may be that the vaporization portion of the heat pump includes the evaporator and a suction line portion of the internal heat exchanger.

While the dry saturation location may be described as corresponding to transition from multiphase saturated refrigerant to dry saturated refrigerant, it may instead be defined (with equivalent meaning) as the location within the vaporization portion of the heat pump where the dryness fraction reaches 1.

The predetermined target location may be a range. For example, a lower limit of the range may be at least 80% along a flow path through the evaporator, for example at least 90%, at least 95% or 100%. The lower limit of the range may correspond to no more than 10% of superheating being conducted in the evaporator, for example no more than 5% or 0% of superheating being conducted in the evaporator. An upper limit of the range may be no more than 50% along a flow path through the internal heat exchanger, for example no more than 30%, no more than 15%, no more than 5% or 0% along the flow path. The upper limit of the range may correspond to 100% of superheating being conducted in the internal heat exchanger. Any of the lower and upper limits may be combined in any permutation. Merely as examples of such combinations, the predetermined location may be between 80% along the flow path through the evaporator (80%-evaporator in abbreviated form) to 50% along the flow path through the internal heat exchanger (50%-IHX in abbreviated form), for example between 80%-evaporator to 30%-IHX, or 80%-evaporator to 15%-IHX, or 80% evaporator to 5%-IHX. The range may be between 90%-evaporator to 50%-IHX, between 90%-evaporator to 30%-IHX, or 90%-evaporator to 15%-IHX, or 90% evaporator to 5%-IHX. The range may be between 95%-evaporator to 50%-IHX, between 95%-evaporator to 30%-IHX, or 95%-evaporator to 15%-IHX, or 95% evaporator to 5%-IHX. The range may be between 100%-evaporator to 50%-IHX, between 100%-evaporator to 30%-IHX, 100%-evaporator to 15%-IHX, or 100% evaporator to 5%-IHX.

The range may be between 5%-IHX to 50%-IHX, between 5%-IHX to 30%-IHX, 5%-IHX to 15%-IHX. The range may be between 10%-IHX to 50%-IHX, or between 10%-IHX to 30%-IHX. The range may correspond to 10% of superheating being conducted in the evaporator to 100% of superheating being conducted in the internal heat exchanger.

It may be that the predetermined target location for the dry saturation location corresponds to concentrating evaporative heating in the evaporator and concentrating superheating in the internal heat exchanger.

It may be that maintenance of the dry saturation location at the predetermined location corresponds to causing at least 90% of superheating upstream of the compressor to be performed in the internal heat exchanger, for example at least 95%, or 100% of superheating.

The variable superheating operating map may include at least two operating points corresponding to first and second heat different transfer rates at the evaporator.

According to a second aspect there is provided a method of operating a heat pump in accordance with the first aspect (and optionally in accordance with any statement with respect to the first aspect), the method comprising the controller performing a control loop comprising:
  monitoring one or more operating conditions of the heat pump;
  determining a target superheat based on the one or more operating conditions;
  controlling the expansion valve to maintain the target superheat;
  wherein over multiple control loops during operation of the heat pump, the one or more operating conditions vary causing a corresponding variation in the superheat at the control location.

It may be that all refrigerant passing through the condenser passes through both the liquid line and suction line portions of the internal heat exchanger.

It may be that while maintaining the respective target superheat corresponding to prevailing operating conditions, at least 90% of superheating upstream of the compressor is performed in the internal heat exchanger.

It may be that, over the multiple control loops during operation in which the operating conditions vary, the target superheat is determined to maintain a dry saturation location at a predetermined target location within a vaporization portion of the heat pump. It may be that the dry saturation location corresponds to transition from multiphase saturated refrigerant to dry saturated refrigerant. It may be that the vaporization portion of the heat pump includes the evaporator and a suction line portion of the internal heat exchanger.

It may be that the predetermined target location corresponds to concentrating evaporative heating in the evaporator and concentrating superheating in the internal heat exchanger. It may be that the maintenance of the dry saturation location at the predetermined target location causes at least 90% of superheating upstream of the compressor to be performed in the internal heat exchanger, for example at least 95%, or 100% of superheating.

The variable superheating operating map may include at least two operating points corresponding to first and second different heat transfer rates at the evaporator.

According to a third aspect there is provided method, for example a computer-implemented method, comprising:
  simulating operation of a plurality of models of a heat pump, the heat pump comprising:
    a flow path for a vapor compression cycle, the flow path extending through components of the heat pump including, in flow order: a compressor, a condenser, a liquid line pathway, an expansion valve, an evaporator, and a suction line pathway to the compressor; and
    an internal heat exchanger configured to transfer heat from refrigerant in the liquid line pathway to refrigerant in the suction line pathway, to superheat the refrigerant upstream of the compressor;
    wherein the simulation controls a modelled flow of refrigerant through the expansion valve to maintain a target superheat at a control location of the flow path,
  wherein the plurality of models are defined to evaluate a performance parameter of the heat pump as a dependent variable, based on variation of the target superheat as an independent variable.

It may be that, for each of a plurality of operating conditions of the heat pump, determining an optimum target superheat for the heat pump based on a comparison of the performance parameter across each of a respective plurality of the models.

The method may further comprise outputting a control value for the target superheat based on the performance parameter. It may be that the performance parameter is a coefficient of performance of the heat pump.

It may be that, for a plurality of operating points of the heat pump within a variable superheat operating map of operating conditions for the heat pump, the method comprises: outputting a respective control value for the target superheat based on the performance parameter.

The control values for the target superheat may vary through at least a non-zero superheat range within the variable superheat operating map of the heat pump.

It may be that the control values for the target superheat are determined to maintain a dry saturation location at a predetermined location within a vaporization portion of the heat pump, throughout the variable superheat operating map. It may be that the dry saturation location corresponds to transition from multiphase saturated refrigerant to dry saturated refrigerant. It may be that the vaporization portion of the heat pump includes the evaporator and a suction line portion of the internal heat exchanger.

The predetermined location for the dry saturation location may correspond to concentrating evaporative heating in the evaporator and concentrating superheating in the internal heat exchanger.

It may be that maintenance of the dry saturation location at the predetermined location corresponds to causing at least 90% of superheating upstream of the compressor to be performed in the internal heat exchanger, for example at least 95%, or 100% of superheating.

The variable superheating operating map may include at least two operating points corresponding to first and second different heat transfer rates at the evaporator. For example, such first and second different heat transfer rates at the evaporator, as discussed above and elsewhere herein, may differ by at least 10%, for example at least 20%, at least 30% or at least 50%.

It may be that the plurality of models are defined to evaluate the performance parameter of the heat pump as a dependent variable, based on variation of:
  the target superheat as a first independent variable;
  a property of the internal heat exchanger as a second independent variable;
  wherein simulated heat transfer at the internal heat exchanger is a function of the property of the internal heat exchanger;

optionally wherein the property of the internal heat exchanger is selected from or determines a property in the group consisting of:
- a size of a heat transfer area of the internal heat exchanger;
- a cross-sectional area of a path through the internal heat exchanger;
- a length of a path through the internal heat exchanger;
- a refrigerant pressure drop through the internal heat exchanger;
- a number of passes of a path through the internal heat exchanger;
- a parameter relating to a surface of a heat transfer area of the internal heat exchanger.

It may be that the plurality of models are defined to evaluate the performance parameter of the heat pump as a dependent variable, based on variation of one or more operating conditions of the heat pump as further independent variables.

By simulating performance of the heat pump based on one or more of the independent variables discussed above, suitable superheat settings and properties of the internal heat exchanger may be determined corresponding to good operation of the heat pump for a target operating map of operating conditions.

The controller(s) described herein may comprise a processor. The controller and/or the processor may comprise any suitable circuitry to cause performance of the methods described herein and as illustrated in the drawings. The controller or processor may comprise: at least one application specific integrated circuit (ASIC); and/or at least one field programmable gate array (FPGA); and/or single or multi-processor architectures; and/or sequential (Von Neumann)/parallel architectures; and/or at least one programmable logic controllers (PLCs); and/or at least one microprocessor; and/or at least one microcontroller; and/or a central processing unit (CPU), to perform the methods and or stated functions for which the controller or processor is configured.

The controller may comprise or the processor may comprise or be in communication with one or more memories that store that data described herein, and/or that store machine readable instructions (e.g. software) for performing the processes and functions described herein (e.g. determinations of parameters and execution of control routines).

The memory may be any suitable non-transitory computer readable storage medium, data storage device or devices, and may comprise a hard disk and/or solid state memory (such as flash memory). The term "non-transitory", as used herein, is a limitation of the medium itself (i.e., tangible, not a signal) as opposed to a limitation on data storage persistency (e.g., RAM vs. ROM).

In some examples, the computer readable instructions may be transferred to the memory via a wireless signal or via a wired signal. The memory may be permanent non-removable memory, or may be removable memory (such as a universal serial bus (USB) flash drive). The memory may store a computer program comprising computer readable instructions that, when read by a processor or controller, causes performance of the methods described herein, and/or as illustrated in the Figures. The computer program may be software or firmware, or be a combination of software and firmware.

Except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

BRIEF DESCRIPTION OF THE DRAWINGS

Aspects of the disclosure will be described, by way of example, with reference to the accompanying drawings, in which.

DETAILED DESCRIPTION

Figure 1:
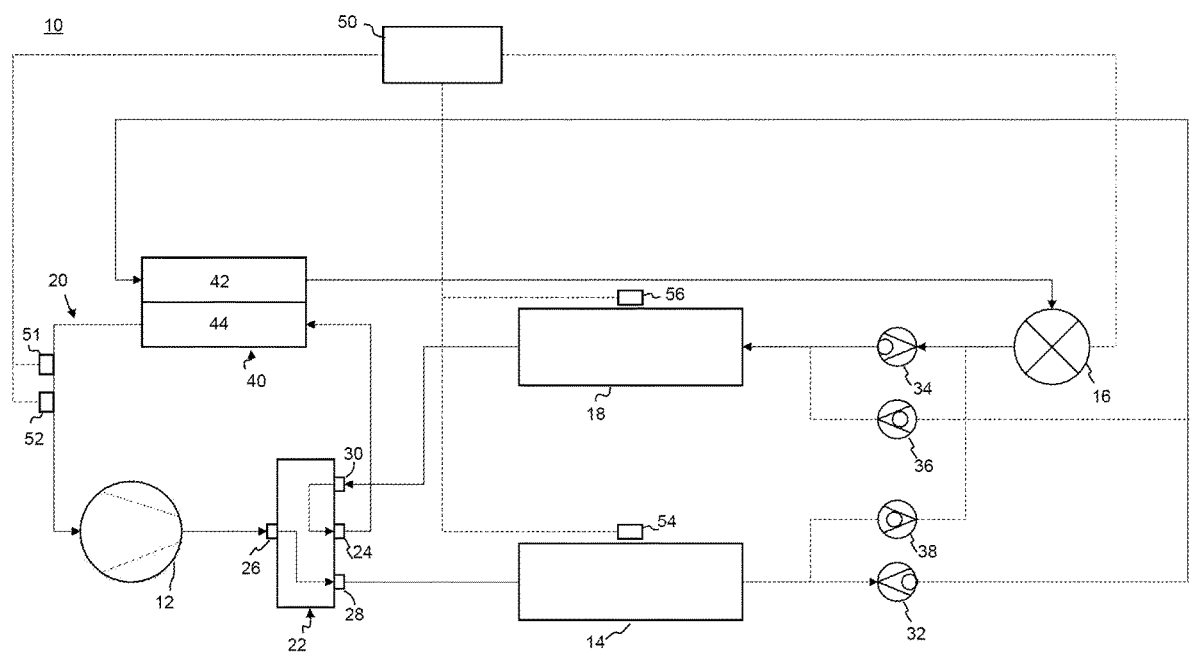
FIG. 1 schematically shows an example heat pump in a cooling mode.
Figure 2:
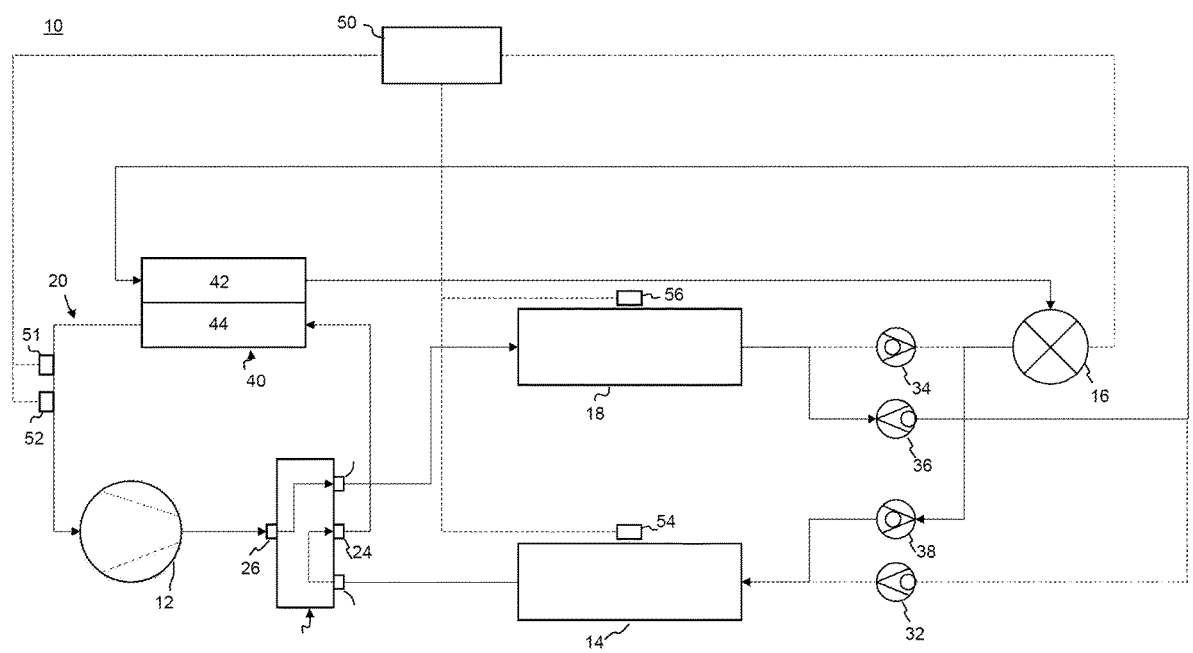
FIG. 2 schematically shows the example heat pump of FIG. 1 in a heating mode.

FIGS. 1 and 2 schematically shows an example heat pump 10 for transferring heat from one heat exchange medium to another, for example between a controlled environment and an ambient environment. Examples applications of such heat pumps include a chiller system (e.g. for centrally heating and cooling a process fluid such as water that circulates within a building or other installation to heat transfer terminals (e.g. for room heating), or a refrigeration system such as an HVAC system or a transport refrigeration system.

The heat pump 10 of FIGS. 1 and 2 comprises a compressor 12, a first heat exchanger 14, an expansion valve 16, and a second heat exchanger 18.

In this example, the heat pump 10 is configured to define two flow paths through the heat pump for operation in different modes, namely a cooling mode and a heating mode (conventionally known as a reversible heat pump). In other examples, a heat pump may be configured for operation in a single mode or with a single direction of flow.

The expressions "heating" and "cooling" refer to the direction of heat transfer with respect to a heat exchange medium which is being actively heated or cooled, for example to maintain a set-point temperature in a controlled environment (e.g. air in a cargo space, or process fluid/water in a chiller system). In the present disclosure, this is referred to as the regulated heat exchange medium.

In the example configuration of FIG. 1, there is a flow path (indicated by arrows) extending through, in flow order, the compressor 12, the first heat exchanger 14 which functions as a condenser for discharging heat to an ambient heat exchange medium (e.g. ambient air), the expansion valve 16, the second heat exchanger 18 which functions as an evaporator for receiving heat from a regulated heat exchange medium, and back to the compressor 12. Accordingly, the flow path of FIG. 1 is for a cooling mode of operation with respect to the regulated heat exchange medium, and it is the second heat exchanger 18 which is in thermal communication with the regulated heat exchange medium.

In contrast, in the example configuration of FIG. 2, there is a flow path (indicated by arrows) extending through, in flow order, the compressor 12, the second heat exchanger 18 which functions as a condenser for discharging heat to the regulated heat exchange medium, the expansion valve 16, the first heat exchanger 14 to receive heat from the ambient heat exchange medium, and back to the compressor 12. Accordingly, the flow path of FIG. 2 is for a heating mode of operation with respect to the regulated heat exchange medium.

While there are many common components between the two flow paths, the paths of fluid communication between them may differ, passing through appropriate valves to direct the flow. In the present disclosure, a portion of the flow path between the compressor and the condenser is referred to as the discharge line pathway, a portion of the flow path between the condenser and the expansion valve is referred to as the liquid line pathway, a portion of the flow path between the expansion valve and the evaporator is referred to as the distribution line pathway, and a portion of the flow path between the evaporator and the compressor is referred to as the suction line pathway. The expression "pathway" is used to reflect that, in the configuration of the heat pump 10 of FIGS. 1 and 2, there is not a constant "liquid line" and "suction line" etc, as the particular path depends on the mode, as will be described below.

In the example of FIGS. 1 and 2, the compressor 12 is disposed within a one-way compressor loop 20 which connects to a remainder of the flow path via a four-way valve 22. The four-way valve 22 has an outlet 24 which conveys refrigerant towards the compressor 12 and an inlet 26 which receives fluid from the compressor 12, with the one-way compressor loop extending between the outlet 24 and the inlet 26. The four-way valve 22 further comprises a first port 28 which is in fluid communication with the first heat exchanger 14 and a second port 30 which is in fluid communication with the second heat exchanger 18. The four-way valve 22 is configured to selectively couple one of the first port 28 and the second port 30 to the inlet 26 (to convey refrigerant received from the compressor to the respective heat exchanger 14, 16), and to couple the other of the first port 28 and the second port 30 to the outlet 24 (to convey refrigerant received from the respective heat exchanger 14, 16 to the compressor 12). In other examples, other flow control (e.g. valve) arrangements may be used to similar effect.

Each of the first and second heat exchangers 14, 18 has a compressor side port for fluid communication with the four-way valve 22 and the compressor, and an opposing expansion side port for fluid communication with the expansion valve 16, either along a respective liquid line pathway or a respective distribution line pathway as will be described in further detail below.

In the cooling configuration of FIG. 1, the discharge line pathway is partially located within the compressor loop 20 between the compressor 12 and the four-way valve, with the remainder extending from the first port 28 to the compressor side port of the first heat exchanger 14 (functioning as a condenser).

A liquid line pathway extends from the expansion side port of the first heat exchanger (condenser) to the expansion valve 16 via a liquid line portion 42 of an internal heat exchanger 40 (as will be described in further detail below).

In this example, flow control equipment is provided to route the refrigerant along respective liquid and distribution line pathways. In the particular example of FIGS. 1 and 2, the liquid line pathway is provided with a check valve 32 which permits flow from the first heat exchanger to the expansion valve, but prevents flow along the opposing direction.

A distribution line pathway extends from the expansion valve 16 to the expansion side port of the second heat exchanger 18 which functions as an evaporator, and in this example is provided with a check valve 34 which permits flow from the expansion valve 16 to the second heat exchanger 18, but prevents flow along the opposing direction.

A suction line pathway is in part provided by a connection between the compressor side port of the second heat exchanger and the second port 30 of the four-way valve 22, and is in part provided by the portion of the compressor loop 20 extending to the compressor 12. As shown in FIGS. 1 and 2, in this example the suction line extends through a suction line portion 44 of the internal heat exchanger 40.

In use in the cooling configuration, gaseous refrigerant is compressed at the compressor 12 to a high pressure and is condensed in the condenser 14 to reject heat to the ambient heat exchange medium and to provide high pressure and high temperature condensed refrigerant in the liquid line pathway. There is heat transfer at the internal heat exchanger from refrigerant in the liquid line pathway to refrigerant in the suction line pathway, which subcools the refrigerant in the liquid line pathway. The subcooled refrigerant is expanded at the expansion valve, to provide a multi-phase refrigerant flow to the evaporator 18. This flow is evaporated in the evaporator 18 and/or the suction line portion 44 of the internal heat exchanger 40, before being provided to the compressor 12. Evaporation at the evaporator 18 cools the regulated heat exchange medium associated with the evaporator.

In the heating configuration of FIG. 2, the discharge line pathway is once again partially located within the compressor loop 20 between the compressor 12 and the four-way valve 22, with the remainder extending from the second port 30 to the compressor side port of the second heat exchanger 18 (functioning as a condenser).

A liquid line pathway extends from the expansion side port of the second heat exchanger 18 (condenser) to the expansion valve 16 via the liquid line portion 42 of the internal heat exchanger 40. The liquid line pathway is provided with a check valve 36 which permits flow from the second heat exchanger to the expansion valve 16, but prevents flow along the opposing direction.

In this example and as shown in FIGS. 1 and 2, part of the liquid line pathway is common between the cooling and heating configurations, with respective branches to the expansion side ports of the heat exchangers, each provided with respective check valves 32, 36 that permit flow towards the expansion valve 16 but prevent flow along the other direction.

A distribution line pathway extends from the expansion valve 16 to the expansion side port of the first heat exchanger 14 which functions as an evaporator, and in this example is provided with a check valve 38 that permits flow from the expansion valve to the evaporator, but prevents flow along the opposing direction.

A suction lie pathway is in part provided by a connection between the compressor side port of the first heat exchanger 14 and the first port 28 of the four-way valve 22, and is in part provided by the portion of the compressor loop 20 extending to the compressor 12 (as described above).

In use in the heating configuration, gaseous refrigerant is compressed at the compressor 12 to a high pressure and is condensed in the condenser 18 to heat the regulated heat exchange medium and to provide high pressure and high temperature condensed refrigerant in the liquid line pathway. As in the cooling configuration, there is heat transfer at the internal heat exchanger 40 from refrigerant in the liquid line pathway to refrigerant in the suction line pathway, which subcools the refrigerant in the liquid line pathway.

The subcooled refrigerant is expanded at the expansion valve, to provide a multi-phase refrigerant flow to the evaporator 14. This flow is evaporated in the evaporator 14 and/or the suction line portion 44 of the internal heat exchanger 40, before being provided to the compressor 12. Evaporation at the evaporator 14 causes the refrigerant to absorb heat from the ambient heat exchange medium.

It is known to provide an internal heat exchanger which transfers heat between refrigerant in the liquid line to refrigerant in the suction line. The effect of the internal heat exchanger is to temporarily remove heat from the refrigerant for the portion of the flow path that extends through the expansion valve and the evaporator. This may permit the dryness fraction (also known as the "quality") of the multiphase fluid in the distribution line (i.e. as discharged by the expansion valve) to be reduced for the same pressure and saturation temperature, thereby increasing the amount of heat which can be absorbed at the evaporator from the respective heat exchange medium by phase change, and effectively increasing the capacity of the heat pump.

In contrast, if there is no internal heat exchanger and the dryness fraction in the distribution line is relatively high, then heat absorption at the evaporator may lead to complete vaporization at an intermediate portion along a path through evaporator, with any additional heat exchange resulting in sensible heating (i.e. temperature increase). It is accepted in the technical field of heat exchangers that heat transfer to cause sensible heating is generally less efficient than evaporative heating. Further, the temperature difference which drives such heat transfer becomes naturally lower as the sensible heating continues and the refrigerant becomes superheated. Accordingly, a relatively high dryness fraction in the distribution line may limit the amount of heat that can be absorbed at the evaporator, thereby limiting the capacity of the heat pump. Increasing the pressure ratio may reduce the dryness fraction by increasing specific heat rejection at the compressor, but an increased pressure ratio is associated with a reduced flow rate and so it can also negatively influence the capacity of the heat pump (i.e. the capacity for heat transfer per unit time).

The inventors have determined that efficient performance of a heat pump may be obtained by operating the heat pump so that, in general, evaporative heating is performed in the evaporator, and sensible heating (i.e. superheating) is performed in the internal heat exchanger. This is considered to maximize the capacity of the heat pump, while enabling the evaporator and the internal heat exchanger to be configured for the respective type of heating (i.e. phase change or sensible heating).

Further, while the inventors have acknowledged that it is desirable to superheat the refrigerant prior to entry into the compressor to avoid damage to the compressor from slugs of (incompressible) liquid refrigerant, it is generally accepted in the technical field that excessive superheating unnecessarily raises the discharge temperature from the compressor and results in considerable heat transfer within the condenser to decrease the refrigerant temperature before phase change can commence. The applicant has previously considered control methods to maintain a moderate constant superheat such as 6° C. upon entry to the compressor.

Operating conditions of a heat pump vary in use, such as (i) a demand for heat transfer (whether cooling or heating), (ii) a temperature of either of the heat exchange medium (e.g. a set-point for a regulated heat exchange medium, or a natural variation in temperature of an ambient heat exchange medium), (iii) a flow rate of refrigerant around the flow path, (iv) a flow rate of a heat exchange medium at the respective heat exchanger, (v) an operating parameter of the compressor, for example an operating speed, power or compression ratio.

Such variations may cause a change in the relative amounts of heat transferred to the refrigerant downstream of the expansion device via (i) the evaporator and (ii) the internal heat exchanger. This may vary the location (the "dry saturation location" or "transition location", as used herein) along the flow path between the expansion device and the compressor at which the refrigerant becomes fully saturated (i.e. dry saturated vapour) and at which superheating begins. As is known in the art, dry saturated conditions corresponds to a dryness fraction of 1, such that the refrigerant is fully vapour and any additional heat input causes sensible heating (rather than phase change). Accordingly, when controlling operation of the heat pump to maintain a constant superheat into the compressor, it may be that the dry saturation location is dependent on the operating conditions of the heat pump: sometimes in the evaporator, and sometimes in the internal heat exchanger.

The applicant has previously considered provision of a means for regulating the amount of heat transfer at the internal heat exchanger, for example by providing a variable proportion of the refrigerant flow to the liquid line portion of the internal heat exchanger. For the avoidance of doubt, such a system is not acknowledged as published prior art for the purposes of the present application. However, when the heat transfer at the internal heat exchanger is regulated, the advantageous effects of the internal heat exchanger are correspondingly reduced.

The inventors have now determined that an efficiency (e.g. a co-efficient of performance, COP) of the heat pump may be improved when the superheat upon entry to the compressor is permitted to vary, with a target superheat being set for particular operating conditions to advantageously distribute the evaporative and sensible heating between the evaporator and the internal heat exchanger, respectively. By permitting the superheat to vary between respective operating conditions of the heat pump, an imbalance between heat transfer in the evaporator and heat transfer in the internal heat exchanger which would otherwise place the dry saturation location in an undesirable location within the evaporator or internal heat exchanger may be accommodated while satisfying the respective demand. For example, given operating conditions which may cause the dry saturation location to be 80% along a flow path through the evaporator with a compressor superheat of 6° C., the dry saturation location may be moved to between the evaporator and the internal heat exchanger at a higher superheat, such as 14° C. Further, this can be achieved without regulating the heat transfer at the internal heat exchanger by controlling (e.g. restricting) a proportion of refrigerant that is provided to the internal heat exchanger. In the examples according to the present disclosure, the flow path is unbranching downstream of the condenser through both the liquid line portion and the suction line portion of the internal heat exchanger, such that in use all refrigerant passing through the condenser passes through both portions of the internal heat exchanger.

A heat pump according to the present disclosure may have an operating map of operating conditions. The operating map may be defined as a constraint on the operating conditions of the heat pump—for example it may be that a controller defines limits for one or more operating conditions (with example operating conditions being indicated above) and only permits operation of the heat pump when the operating conditions are within these limits. Alternatively, it may be that there is no prescribed operating map, in which case the operating map is the set of operating conditions at which the heat pump can satisfy a respective heat transfer demand (this being one of the operating conditions), or maintains a set-point operating temperature.

The advantageous effect of concentrating evaporative heating in the evaporator and sensible heating in the internal heat exchanger may be maintained in a subset of the operating map. For example, it may be that when there is a high demand for cooling at the evaporator, the most efficient way to meet the demand is to perform all evaporative heating and some superheating within the evaporator, as the alternative would be to operate at an excessively high pressure ratio in order to lower the saturation temperature in the distribution line (with the high pressure ratio also limiting the capacity of the heat pump). Similarly, when there is very low demand for cooling at the evaporator, this may be achieved by maintaining the saturation temperature in the distribution line at a relatively small offset below the temperature of the respective heat exchange medium heat. However, there may still be a significant difference in temperature at the internal heat exchanger, thereby concentrating heat exchange in the internal heat exchanger such that some evaporative heating and all superheating is conducted in the internal heat exchanger.

Accordingly, the inventors have determined that, while it is generally advantageous to concentrate evaporative heating in the evaporator and sensible heating in the internal heat exchanger within a portion of the operating map of the heat pump, it may yet be desirable to operate the heat pump in other portions of the operating map (e.g. more peripheral portions of the operating map) while permitting superheating to occur in the evaporator or permitting evaporative heating to occur in the internal heat exchanger.

The inventors have determined that improved efficiency in a practical heat pump can be realized when the internal heat exchanger is suitably sized such that, in a subset of the operating map corresponding to routine or typical operation, evaporative heating is concentrated in the evaporator and sensible heating is concentrated in the internal heat exchanger. It may be that for at least some operating conditions within this subset, all sensible heating (superheating) is performed in the internal heat exchanger.

The evaporator and the suction line portion of the internal heat exchanger may be considered to form a vaporization portion of the heat pump, corresponding to locations where the refrigerant may be vaporized (or indeed superheated) by heat transfer into the refrigerant. Controlling the locations of evaporative and sensible heating corresponds to maintaining the dry saturation location at a predetermined target location within the vaporization portion of the heat pump. For example, the predetermined target location may be at or between the outlet of the evaporator and the inlet of the suction line portion of the internal heat exchanger (and this would correspond to all evaporative heating being conducted in the evaporator and all sensible heating being conducted in the internal heat exchanger). The predetermined target location may be a range. The predetermined target location may be defined by reference to the location along a flow path through the respective components (i.e. a flow path through the evaporator, and a flow path through the suction line portion of the internal heat exchanger) at which dry saturated conditions are reached (i.e. a dryness fraction of 1), or by reference to an amount of superheating conducted in the respective component (both as discussed elsewhere herein).

Operation of the example heat pump 10 of FIGS. 1 and 2 to achieve these advantages is achieved by a controller 50 monitoring one or more operating conditions of the heat pump and determining a target superheat of refrigerant at a control location of the flow path of the heat pump, for example a control location between the internal heat exchanger and the compressor (thereby directly monitoring superheat at entry to the compressor). The one or more operating conditions may be as listed above (with numerals (i) to (v)). The expansion valve is controlled to maintain the target superheat.

As shown in the example heat pump 10 of FIGS. 1 and 2, the controller 50 is operatively coupled to the expansion valve 16 and to one or more sensors for monitoring operating conditions of the heat pump. FIGS. 1 and 2 show a temperature sensor 51 and a pressure sensor 52 at a control location between the internal heat exchanger 40 and the compressor 12 within the compressor loop (i.e. in the suction line downstream of the internal heat exchanger), for monitoring a temperature of the refrigerant and a pressure of the refrigerant respectively. As the pressure is substantially constant along the distribution line and suction line, in variant examples a pressure sensor may be located at any suitable location along the distribution line and suction line. By monitoring both pressure and temperature, the superheat at the control location can be determined.

By way of example, FIGS. 1 and 2 also show further example sensors, including an ambient temperature sensor 54 configured to monitor a temperature of an ambient heat exchange medium in thermal communication with the first heat exchanger 14, and a regulated medium temperature sensor 56 configured to monitor a temperature of the regulated heat exchange medium. Any of these temperatures and/or a difference between a respective temperature and a set-point temperature (corresponding to a heat transfer demand) may be an operating condition of the heat pump.

Further example operating conditions include a flow rate (or related parameter) of a heat exchange medium at either of the first and second heat exchangers 14, 18, which may be monitored by a flow sensor. Alternatively or additionally, the controller may monitor an operating parameter of a device configured to direct a heat exchange medium over or through the condenser and/or the evaporator (e.g. by monitoring a power or control setting of a fan, blower or pump associated with the respective heat exchange medium). Such operating parameters are associated with the flow rate and thereby the heat transfer rate at the respective heat, and so reflect operating conditions of the heat pump.

Yet further example operating conditions include a flow rate of refrigerant along the flow path of the heat pump, as may be monitored by a flow sensor disposed at any suitable location around the flow path. Additionally or alternatively, an operating parameter related to the flow rate may be monitored, such as an operating speed, power or compression ratio of the compressor. It will be appreciated that such parameters are related to the operating conditions prevailing in the heat pump.

A method 300 of operating the heat pump 10 will now be described by reference to the flow diagram of FIG. 3. In block 302, the controller 50 monitors one or more operating conditions of the heat pump, for example by monitoring signals from any combination of the sensors described above. In this example, the controller monitors the temperature and pressure at the superheat location for the superheat determination, and monitors the temperature of the ambient heat exchange medium and the temperature of the regulated heat exchange medium which represent the operating conditions of the heat pump.

In block 304, the controller determines a target superheat for the heat pump, based on the monitored operating conditions. For example, the controller may be configured to determine the target superheat from a predetermined model or database which correlates the one or more operating conditions (e.g. the temperatures of the ambient and the regulated heat exchange media) with a target. In this example, the predetermined model or database is stored on a non-transitory machine-readable medium of the controller 50, but in variant examples the predetermined model or database may be stored remotely from the controller and/or remotely from the heat pump, and may be accessed via a wired or wireless link, for example over the internet.

The predetermined model or database outputs a target superheat for the given operating conditions. The model or database is configured to output target superheats for operating conditions within the operating map for the heat pump which vary through a non-zero superheat range. In other words, the target superheat varies throughout the operating map of operating conditions for which the model or database is configured to provide target superheats (the variable superheat operating map). The superheat range is the difference between two target superheat values that are to be output. For example, the superheat range for the operating map of the heat pump may be at least 5°, at least 10° C., at least 15°, or at least 20°.

In block 306, the controller controls the expansion valve to maintain the target superheat (i.e. by controlling a degree of opening of the expansion valve to vary the flow rate and pressure drop over the expansion valve, as is known in the technical field).

It may be that other operating parameters of the heat pump are also determined based on the one or more operating conditions, for example a speed, power or compression ratio of the compressor and/or a speed of an evaporator fan (or blower) and/or of a condenser fan (or blower). Such parameters may be determined by the same or a different controller (and/or control loop).

Figure 3:
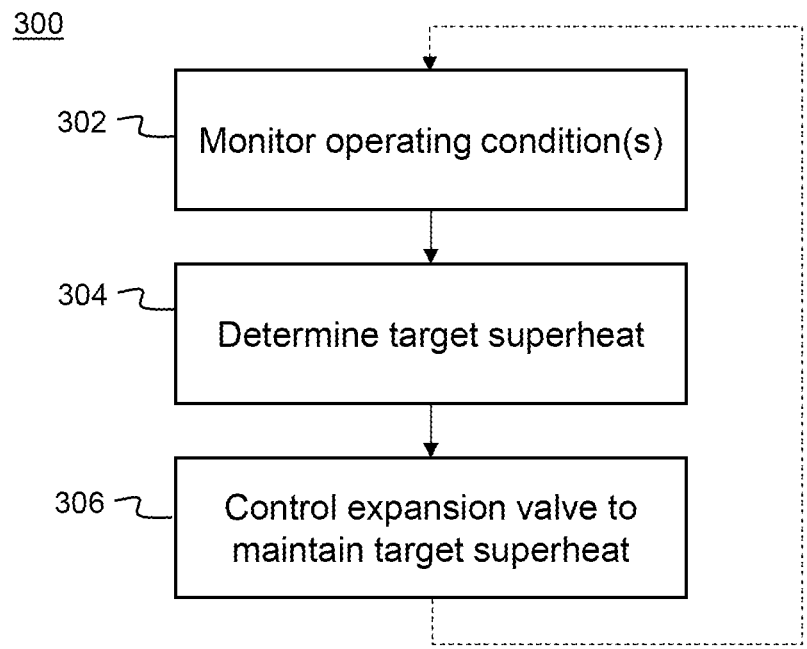
FIG. 3 is a flow diagram of an example method of operating a heat pump.

The method 300 of FIG. 3 may be repeated as part of a repeating control loop, for example running at predetermined intervals (e.g. every 5 seconds) or in response to monitored changes in operating conditions. In continued operation of the heat pump, the operating conditions vary such that there is a corresponding variation in the superheat at the control location (both the target superheat and the actual superheat achieved based on the target superheat).

Figure 4:
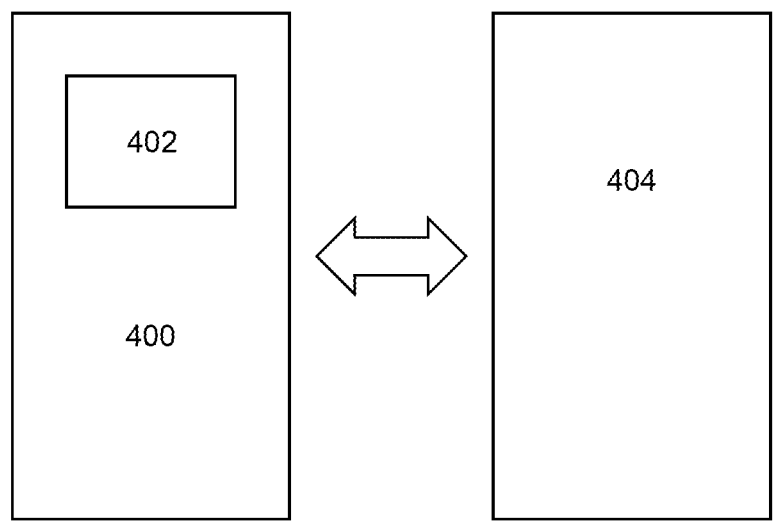
FIG. 4 schematically shows a machine readable medium and processor.

FIG. 4 shows a non-transitory machine readable medium 400 comprising instructions 402 which are configured to be executed by a processor 404. As described above, the controller 50 may comprise such a non-transitory machine readable medium 400 and instructions 402, and/or may comprise a processor 404 for execution of the instructions. The instructions may be to configured to cause performance the method 300 as described herein, for example by the processor in operative communication with the associated sensors and other components of the heat pump (e.g. the expansion valve 16 and any controlled components as described above). Alternatively, such a non-transitory machine readable medium may be provided remotely from the heat pump as mentioned above.

The model or database correlating the one or more operating conditions of the heat pump with respective target superheats may be predetermined. For example, the target superheats may be determined based on empirical results (e.g. testing) of suitable superheats for respective operating conditions. Alternatively, the model or database may be defined based on target superheats obtained via simulation. The target superheats determined by reference to the model or database may be defined so that, within the variable superheat operating map, a dry saturation location is maintained at a predetermined target location within the vaporization portion of the heat pump, as discussed above).

Figure 5:
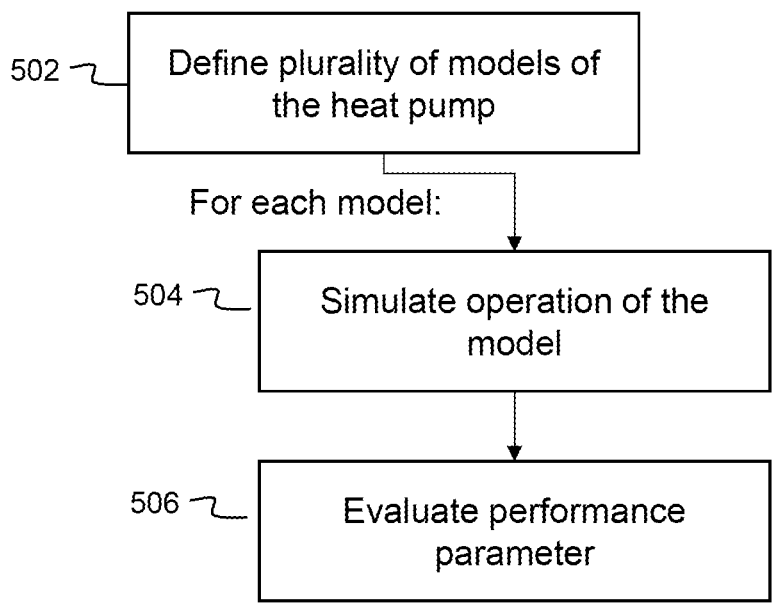
FIG. 5 is a flow diagram of an example simulation method.

FIG. 5 shows a first example method 500 (in this example, a computer-implemented method) of simulating operation of a heat pump to determine a target superheat, with such target superheats (or a derived trend or relationship for such target values of superheats) being modelled or included in the predetermined model or database.

In the following description, a heat pump substantially as described above with reference to FIGS. 1 and 2 is simulated, for example by flow and heat transfer simulation software. A model for the heat pump as defined herein corresponds to a simulation of the heat pump with respective operating conditions. Accordingly, simulating a plurality of models of a heat pump corresponds to simulating operation of the same heat pump at different operating conditions. The simulation emulates the control of the expansion valve 16 of the heat pump 10 of FIGS. 1 and 2 to maintain the target superheat. Accordingly, when the simulation specifies a target superheat, it simulates operation of the expansion valve to achieve that target superheat, with corresponding effects relating to the expansion at the valve (i.e. pressure changes, saturation temperature changes, flow rate changes, etc).

In block 502 of the method 500, a plurality of models of the heat pump are defined. The models are defined such that between them there is variation in the target superheat to be achieved at the control location, such that the target superheat is an independent variable.

For each model, in block 504 the operation of the heat pump is simulated, and at block 506 a performance parameter for the heat pump is evaluated. The performance parameter may be a coefficient of performance (COP), for example.

The performance parameter may therefore be considered to be a dependent variable evaluated based on variation of the target superheat as an independent variable. By comparing the performance parameter across the respective models, it can be determined which is the optimum target superheat for the respective operating conditions.

The method may comprise outputting a control value for the target superheat based on the performance parameter (or performance parameters). The expression "control value" is used here in recognition that each model has been run at a target superheat, and the control value corresponds to the target superheat that is selected for operation of the heat pump at the selected conditions (e.g. based on the simulation and analysis as described above). It may be that the target superheats are determined or selected so as to cause a dry saturation location within a vaporization portion of the heat pump to be maintained at a predetermined target location, as discussed elsewhere herein.

The models can be defined to evaluate the effects of further independent variables. In particular, a property of the internal heat exchanger that influences (i.e. determines) heat transfer at the internal heat exchanger can be varied between the models as a further independent variable. For example, the property may be, or may be derived from any of a size of a heat transfer area of the internal heat exchanger, a cross-sectional area of a path through the internal heat exchanger (which corresponds to a refrigerant velocity through the heat exchanger), a length of a path through the internal heat exchanger, a refrigerant pressure drop through the internal heat exchanger (corresponding to the cross sectional area of the path, the length of the path, and the velocity of refrigerant and/or mass flow rate) a number of passes of a path through the internal heat exchanger, and a parameter relating to the surface of the heat transfer area of the internal heat exchanger—for example a property of a geometric feature of the heat transfer surface related to heat transfer, such as a roughness, or a property of a turbulator feature.

By simulating operation while varying the property of the internal heat exchanger as a further independent variable, the target superheat associated with different designs of the internal heat exchanger can be evaluated. Accordingly, a suitable design of the internal heat exchanger may be selected—for example one that corresponds to a good balance between the performance parameter and a practical target superheat, for example over a range of operating conditions.

As a further independent variable (i.e. in addition to the target superheat and/or the property of the internal heat exchanger), the models may be defined to evaluate the impact of varying one or more operating conditions, such as the operating conditions as described above. Accordingly, a range of suitable target superheats may be determined throughout an operating map corresponding the varied operating conditions. Further, where there is a subset of operating conditions (i.e. a subset of the operating map) corresponding to intended or typical operation of the heat pump, the selection of a suitable design for the internal heat exchanger may be performed to prioritise the achievement of a good performance (i.e. based on the performance parameter) within a practical range of target superheats. For example, for a subset of the operating map corresponding to typical operating conditions, it may be that an internal heat exchanger of a particular size results in a good performance parameter, for example owing to the evaporative heating being concentrated in the evaporator and sensible heating being concentrated in the internal heat exchanger (or mainly performed in the internal heat exchanger, for example at least 90% of the superheating, or 100% of the superheating). Accordingly, the associated property or properties of the internal heat exchanger may be selected for use in a heat pump to be manufactured, with target superheats being determined for that subset of the operating map. It may be that the target superheats are determined or selected so as to cause a dry saturation location within a vaporization portion of the heat pump to be maintained at a predetermined target location, as discussed elsewhere herein. It may be that, outside of the subset of the operating map corresponding to typical operating conditions, the selected property for the internal heat exchanger does not result in the optimum performance parameter for the given operating conditions. Additionally or alternatively, it may be that outside of the respective subset corresponding to typical operating conditions, a good balance of the performance parameter and a practical superheat is achieved by specifying a target superheat that causes the dry saturation location to move further upstream into the evaporator or downstream into the internal heat exchanger than may be permitted in the subset of the operating map corresponding to typical operating conditions.

In the method 500 of FIG. 5, the ranges of the respective independent variables to be explored may be selected based on experience of the skilled person—for example to evaluate the effect of varying the operating conditions withing feasible operating ranges, considering practical sizing of the internal heat exchanger, and practical superheats.

Figure 6:
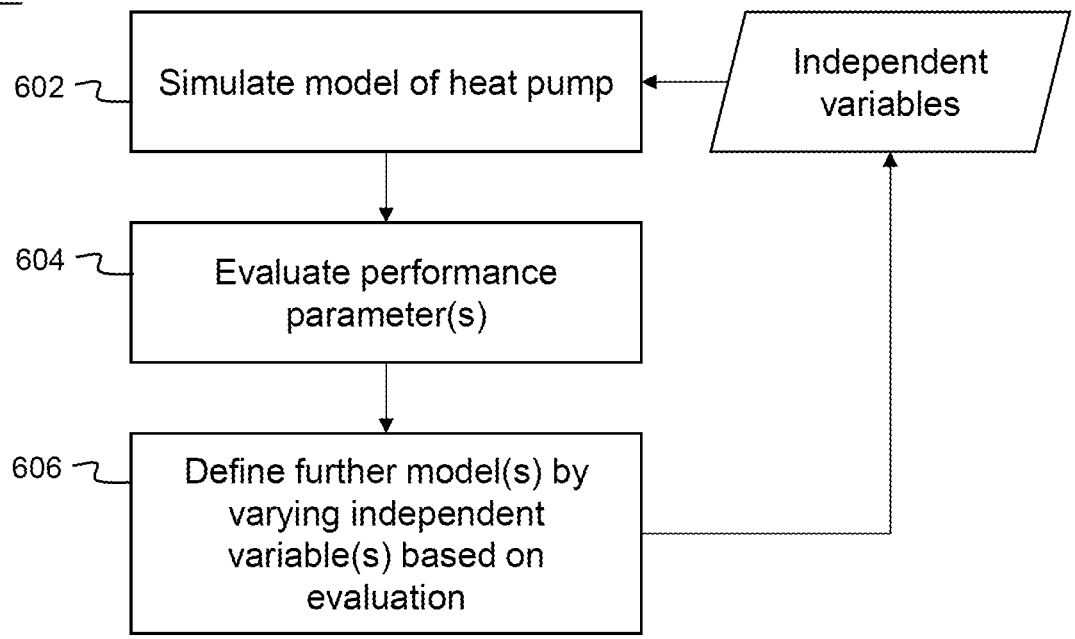
FIG. 6 is a flow diagram of a further example simulation method.

FIG. 6 shows a further example method 600 which is similar to the method 500 of FIG. 5 in that it simulates a plurality of models, but which differs in that the models are iteratively defined based on the results of earlier simulations.

In block 602, a model of a heat pump is simulated. In the first simulation, the model may be a baseline model in which the values for any independent variables are set by an operator of the simulation. In block 604, the performance parameter (e.g. COP) is evaluated, as described above with respect to block 506 of FIG. 6.

In block 606, a further model is defined in which one or more of the independent variables is varied from the earlier or an earlier-simulated model, based on the evaluation of the performance parameter. The varied independent variable(s) are defined for use in a subsequent loop of the method 600, with a further simulation being performed at block 602 and the process repeated until a termination criterion is met (e.g. number of iterations, convergence of values for the independent variables).

Any suitable method for determining the variation of the independent variables may be applied, considering known principles of optimization and iterative analysis.

The independent variables may be as described above with respect to the example method 500 of FIG. 5 (i.e. target superheat, property of the internal heat exchanger, operating conditions).

The performance parameter may be as described above with respect to the example method 500 of FIG. 5 (e.g. coefficient of performance, COP).

The method 600 may additionally involve the evaluation of a performance parameter relating to the dry saturation location. In particular, it is considered that, by varying the one or more independent variables to target a dry saturation location corresponding to evaporative heating being performed in the evaporator and sensible heating being performed in the internal heat exchanger, the iterative simulation may be driven towards a solution at which the target superheat and/or property of the internal heat exchanger are selected to result in a desirable distribution of evaporative and sensible heating. The inventors consider that such a distribution results in advantageous operation of the heat exchanger, both for achieving a good performance (e.g. a good coefficient of performance, COP), and so that heat exchangers having a structure which is optimized for the respective type of heating (i.e. evaporative or sensible) can be selected. For example, a suitable criterion may be defined to steer the iterative definition of the independent variables, such as a weighted function of the dry saturation location and a local maxima of another performance parameter (e.g. coefficient of performance). It may be that the criterion is defined to prioritise the dry saturation location more strongly for a subset of operating conditions (i.e. a subset of the operating map) corresponding to typical operation, whereas the dry saturation location is permitted to vary more widely outside of that subset, with the target superheat being permitted to vary to optimize the coefficient of performance, for example.

A computer-implemented simulation method as described above with respect to FIG. 5 and/or FIG. 6 may be implemented on a computer or other processing apparatus. Instructions for causing performance of the respective methods may be stored on a non-transitory machine-readable medium for execution by a processor. FIG. 4 shows an example non-transitory machine readable medium comprising instructions, for execution by an associated processor.

While FIG. 4 has been described above with reference to instructions for execution by a controller of a heat pump, the same basic configuration of a non-transitory machine-readable medium and processor may be used separate from a heat pump for the purposes of implementing the simulation method of FIGS. 5 and 6. Such a simulation method may performed using a general purpose computer or a high-performance computing resource.

The invention claimed is:

1. A computer-implemented method comprising:
simulating operation of a plurality of models of a heat pump, the heat pump comprising:
a flow path for a vapor compression cycle, the flow path extending through components of the heat pump including, in flow order: a compressor, a condenser, a liquid line pathway, an expansion valve, an evaporator, and a suction line pathway to the compressor; and
an internal heat exchanger configured to transfer heat from refrigerant in the liquid line pathway to refrigerant in the suction line pathway, to superheat the refrigerant upstream of the compressor;
wherein the simulation controls a modelled flow of refrigerant through the expansion valve to maintain a target superheat at a control location of the flow path;
wherein the plurality of models is defined to evaluate a performance parameter of the heat pump as a dependent variable, based on variation of the target superheat as an independent variable;
for each of a plurality of operating conditions of the heat pump, determining an optimum target superheat for the heat pump based on a comparison of the performance parameter across each of a respective plurality of the models; and
wherein the plurality of models are defined to evaluate the performance parameter of the heat pump as a dependent variable, based on variation of:
the target superheat as a first independent variable;
a property of the internal heat exchanger as a second independent variable;
wherein simulated heat transfer at the internal heat exchanger is a function of the property of the internal heat exchanger;
wherein the property of the internal heat exchanger is selected from or determines a property in the group consisting of:
a size of a heat transfer area of the internal heat exchanger;
a cross-sectional area of a path through the internal heat exchanger;
a length of a path through the internal heat exchanger;
a refrigerant pressure drop through the internal heat exchanger;
a number of passes of a path through the internal heat exchanger;
a parameter relating to a surface of a heat transfer area of the internal heat exchanger.

* * * * *